(12) United States Patent
Oguro et al.

(10) Patent No.: US 10,875,529 B2
(45) Date of Patent: Dec. 29, 2020

(54) VEHICLE CONTROL DEVICE

(71) Applicant: HONDA MOTOR CO., LTD., Tokyo (JP)

(72) Inventors: Hiroshi Oguro, Wako (JP); Daichi Kato, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 20 days.

(21) Appl. No.: 16/344,171

(22) PCT Filed: Sep. 1, 2017

(86) PCT No.: PCT/JP2017/031555
§ 371 (c)(1),
(2) Date: Apr. 23, 2019

(87) PCT Pub. No.: WO2018/079069
PCT Pub. Date: May 3, 2018

(65) Prior Publication Data
US 2019/0315350 A1 Oct. 17, 2019

(30) Foreign Application Priority Data

Oct. 25, 2016 (JP) ................. 2016-208436

(51) Int. Cl.
*B60W 30/095* (2012.01)
*G01C 21/36* (2006.01)
(Continued)

(52) U.S. Cl.
CPC .......... *B60W 30/095* (2013.01); *B60W 40/06* (2013.01); *G05D 1/02* (2013.01); *G08G 1/017* (2013.01); *G08G 1/16* (2013.01)

(58) Field of Classification Search
CPC ...... B60W 30/095; B60W 30/12; G08G 1/16; G08C 21/36; G01S 13/93
See application file for complete search history.

(56) References Cited

U.S. PATENT DOCUMENTS

| 5,425,139 A | 6/1995 | Williams et al. |
| 5,710,565 A * | 1/1998 | Shirai .................. B62D 1/28 342/70 |

(Continued)

FOREIGN PATENT DOCUMENTS

| JP | 2007-323333 A | 12/2007 |
| JP | 4623057 B2 | 2/2011 |

(Continued)

OTHER PUBLICATIONS

PCT/ISA/210 from International application PCT/JP2017/031555 with the English translation thereof.

*Primary Examiner* — Yuri Kan
(74) *Attorney, Agent, or Firm* — Carrier Blackman & Associates, P.C.; Joseph P. Carrier; Jeffrey T. Gedeon

(57) ABSTRACT

A vehicle control device includes a mid-term trajectory generation unit and a short-term trajectory generation unit, one of which generates a travel trajectory on which a vehicle can travel without interfering with an obstacle. The mid-term trajectory generation unit or the short-term trajectory generation unit: generates a travel route that passes through a second potential-travelling region which is obtained by subtracting obstacle regions, indicating obstacles, from a vehicle first potential-travelling region that is defined by the road environment; and generates the travel trajectory on the basis of the generated travel route.

6 Claims, 8 Drawing Sheets

(51) Int. Cl.
*G08G 1/16* (2006.01)
*B60W 30/12* (2020.01)
*G01S 13/93* (2020.01)
*B60W 40/06* (2012.01)
*G05D 1/02* (2020.01)
*G08G 1/017* (2006.01)

(56) References Cited

U.S. PATENT DOCUMENTS

| | | | |
|---|---|---|---|
| 6,025,797 A * | 2/2000 | Kawai | G01S 7/4026 |
| | | | 342/70 |
| 2008/0303696 A1 | 12/2008 | Aso et al. | |
| 2012/0130595 A1 * | 5/2012 | Hayakawa | B60W 30/12 |
| | | | 701/42 |
| 2013/0184976 A1 | 7/2013 | Akiyama et al. | |
| 2014/0229106 A1 * | 8/2014 | Ishikawa | G01C 21/3647 |
| | | | 701/533 |
| 2016/0125738 A1 * | 5/2016 | Rosen | G08G 1/166 |
| | | | 701/70 |

FOREIGN PATENT DOCUMENTS

| | | |
|---|---|---|
| JP | 2011-170843 A | 9/2011 |
| JP | 2012-079118 A | 4/2012 |
| JP | 2015-016799 A | 1/2015 |

* cited by examiner

VEHICLE CONTROL DEVICE

TECHNICAL FIELD

The present invention relates to a vehicle control device that generates a travel trajectory along which a vehicle is able to travel without interfering with obstacles and that controls the behavior of the vehicle based on the generated travel trajectory.

BACKGROUND ART

Vehicle control devices that recognize objects outside a vehicle and control the behavior of the vehicle based on the result of the recognition are known. For example, various techniques have been proposed for allowing a host vehicle to travel and to avoid interference with obstacles such as other vehicles present ahead in the direction of travel. Japanese Patent No. 4623057 proposes, in order to avoid interference between the host vehicle and an obstacle present ahead in the direction of travel, calculating a safety level for a selected possible route of the host vehicle and expanding the traveling area of the host vehicle to an expanded area including a zebra zone or the like in accordance with the calculated safety level.

SUMMARY OF INVENTION

When a trajectory length is short in the case of controlling the behavior of the host vehicle based on a predetermined travel trajectory, there is a problem that a travel trajectory for avoiding an obstacle cannot be generated in time after the possibility of interference between the host vehicle and the obstacle has been determined. Japanese Patent No. 4623057 proposes no solution to such a problem.

The present invention has been made for solving the above problem and an object thereof is to provide a vehicle control device that is capable of generating a travel trajectory for avoiding interference between a vehicle and an obstacle after determining the possibility of such interference even when the trajectory length is short.

A vehicle control device according to the present invention includes: an outside state detection unit for detecting an outside state of a vehicle; a road environment recognition unit for recognizing a road environment based on a detection result obtained by the outside state detection unit; an obstacle recognition unit for recognizing one or more obstacles based on a detection result obtained by the outside state detection unit; and a trajectory generation unit for generating a travel trajectory which the vehicle is able to travel without interfering with the obstacles based on the road environment recognized by the road environment recognition unit and the obstacles recognized by the obstacle recognition unit. The trajectory generation unit generates the travel trajectory that passes through a second drivable zone, the second drivable zone being determined by subtracting obstacle areas indicative of the obstacles from a first drivable zone for the vehicle defined by the road environment.

With this configuration, the second drivable zone, which is a portion of the first drivable zone that does not overlap the obstacle areas, is calculated by subtracting the obstacle areas from the first drivable zone, and the travel trajectory is generated so as to pass through the calculated second drivable zone. This makes it possible to generate a travel trajectory for avoiding interference between the vehicle and the obstacles after determining the possibility of such interference beforehand even when the trajectory length is short.

The trajectory generation unit may calculate the second drivable zone by defining the first drivable zone at intervals of a predetermined time or a predetermined distance and subtracting the obstacle areas from the first drivable zone defined. This enables efficient determination of the possibility of interference between the vehicle and the obstacles and generation of a travel trajectory for avoiding the interference.

The first drivable zone is each of a road width across which the vehicle is allowed to travel when the obstacle areas are not present, and the second drivable zone is each of a road width across which the vehicle is allowed to travel when the obstacle areas are present. In this case, the trajectory generation unit may generate the travel trajectory by setting a predetermined position in a width direction of the second drivable zone as a target point for the vehicle and connecting the set target point with preceding target points at intervals of the predetermined time or the predetermined distance. Thus, the travel trajectory for avoiding interference between the vehicle and the obstacles can be generated immediately after the possibility of such interference is determined.

In this case, the trajectory generation unit may set a center point in the width direction of the second drivable zone as the target point. This allows the vehicle to travel without interfering with the obstacles along the travel trajectory.

The vehicle control device further includes an ideal travel line generation unit for generating an ideal travel line that passes through a center position in a width direction of the first drivable zone based on the road environment recognized by the road environment recognition unit. In this case, the trajectory generation unit may generate the travel trajectory so as to be approximate to the ideal travel line generated by the ideal travel line generation unit. The ideal travel line is a route of the vehicle that passes through the center position of the travel lane when there is no obstacle. Thus, by generating the travel trajectory so as to be approximate to the ideal travel line, the vehicle is allowed to travel while avoiding interference.

When a second drivable zone having a width equal to or less than a predetermined threshold is present in a direction of travel of the vehicle, the trajectory generation unit may calculate a distance from the vehicle to that second drivable zone as a movable distance for the vehicle; or when the travel trajectory intersects with any of the obstacle areas in the direction of travel of the vehicle, the trajectory generation unit may calculate a distance from the vehicle to the second drivable zone preceding a point of intersection as a movable distance for the vehicle.

Thus, when the travel of the vehicle is determined to be impossible due to the presence of the obstacle area, interference between the vehicle and the obstacle can be reliably avoided by setting a travel trajectory corresponding to the length of the movable distance up to a point preceding the obstacle area in question. If travel is determined to be impossible with both the two approaches of determination, the shorter distance may be selected to improve the accuracy of the determination result. Additionally, because a target speed for avoiding the interference can be calculated from the movable distance, generation of a travel trajectory for avoiding the interference is facilitated.

The road environment recognition unit may recognize, from information on both-side boundaries or road structures on a travel lane for the vehicle contained in the road environment, the travel lane as partitioned into a basic travel range in a width direction of the travel lane and deviation tolerance ranges on outer sides of the basic travel range. The trajectory generation unit thereby can generate the travel trajectory with the basic travel range during a normal time, whereas the trajectory generation unit can generate the travel trajectory with the deviation tolerance ranges when the basic travel range is of a certain width or less or when the obstacle areas are present near a center of the basic travel range.

That is, as the vehicle is made to travel on the travel lane during a normal time without obstacles on the travel lane, setting the travel trajectory in the basic travel range can make the vehicle travel in the basic travel range.

By contrast, when an obstacle is present on the travel lane, the vehicle travels pulling to either one of the right and left road shoulders of the travel lane (the road shoulder with a greater width). Thus, when the basic travel range is of the certain width or less or when an obstacle is present near the center of the basic travel range, the travel trajectory is generated with the deviation tolerance range corresponding to either road shoulder, thereby allowing the vehicle to travel while avoiding interference with the obstacle.

Further, the obstacle recognition unit may identify one or more objects present in the direction of travel of the vehicle as the obstacles based on a detection result obtained by the outside state detection unit, and generate the obstacle areas of polygon shapes encompassing the identified obstacles. This enables efficient processing at the trajectory generation unit by grouping obstacles into the obstacle areas even when multiple obstacles are present ahead of the vehicle in the direction of travel.

The vehicle control device may further include a vehicle control unit for controlling the vehicle based on a travel trajectory generated by the trajectory generation unit, thus enabling efficient control of the behavior of the vehicle using the travel trajectory.

DESCRIPTION OF EMBODIMENTS

The vehicle control device according to the present invention is described below by showing preferred embodiments with reference to the accompanying drawings.

1. CONFIGURATION OF VEHICLE CONTROL DEVICE 10

<1.1 Overall Configuration>

Figure 1:
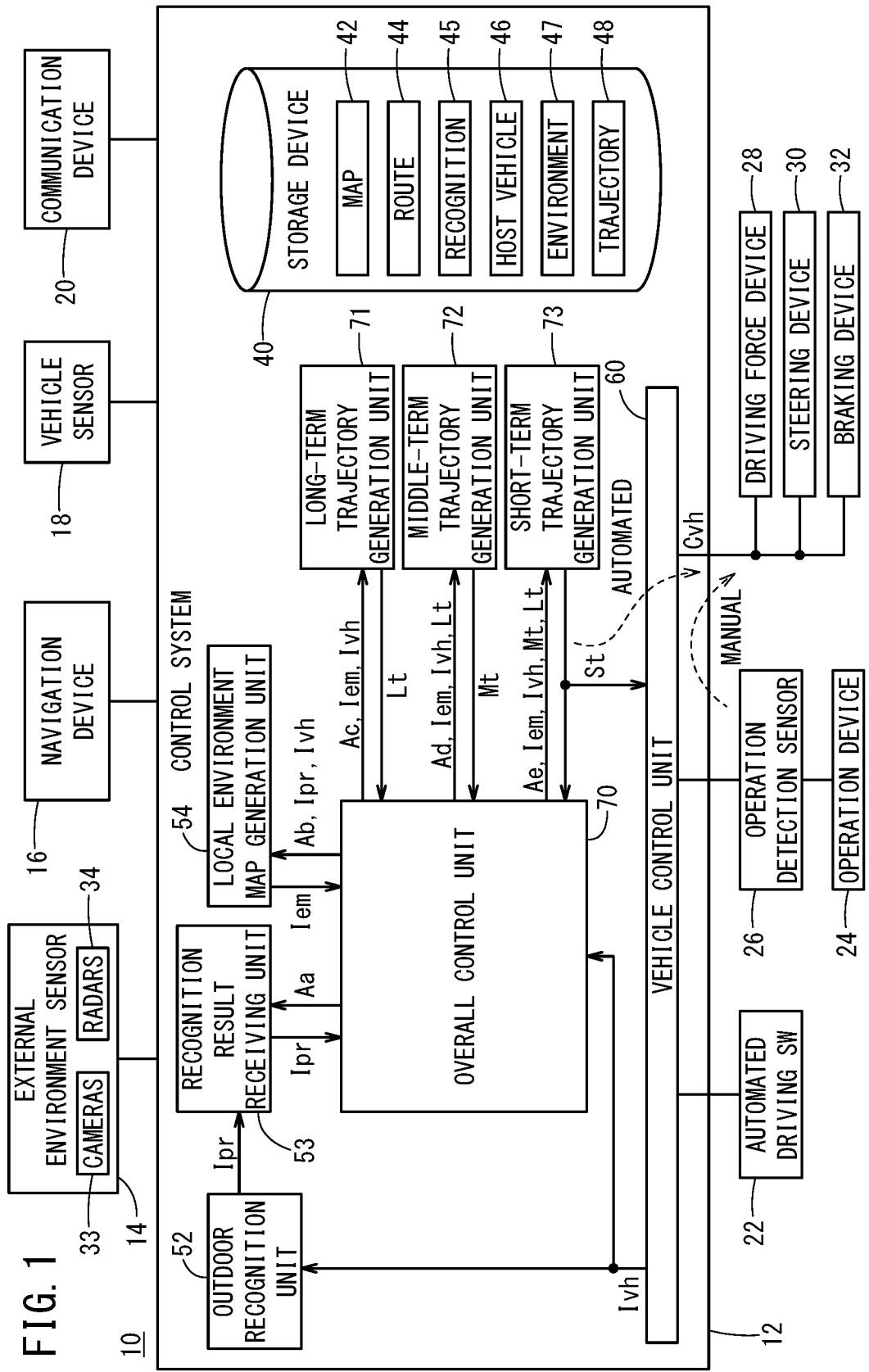
FIG. 1 is a block diagram showing a configuration of a vehicle control device according to an embodiment of the present invention.

FIG. 1 is a block diagram showing a configuration of a vehicle control device 10 according to an embodiment of the present invention. The vehicle control device 10 is incorporated in a vehicle 100 (FIGS. 5 to 8) and configured to be capable of executing automated driving of the vehicle 100 or automated driving assist. The vehicle control device 10 includes a control system 12, an input device, and an output device. The input device and the output device are each connected with the control system 12 through communication lines.

The input device includes an external environment sensor 14, a navigation device 16, a vehicle sensor 18, a communication device 20, an automated driving switch 22, and an operation detection sensor 26 connected with an operation device 24.

The output device includes a driving force device 28 for driving wheels (not shown), a steering device 30 for steering the wheels, and a braking device 32 for braking the wheels.

<1.2 Specific Configuration of Input Device>

The external environment sensor 14 includes multiple cameras 33 and multiple radars 34 for obtaining information indicating an outside environment of the vehicle 100 (hereinafter outside information) and outputs the outside information obtained to the control system 12. The external environment sensor 14 may further include multiple LIDAR (Light Detection and Ranging, Laser Imaging Detection and Ranging) devices.

The navigation device 16 includes a satellite positioning device capable of detecting the current position of the vehicle 100, and user interfaces (for example, a touch panel display, a speaker, and a microphone). The navigation device 16 calculates a route to a specified destination based on the current position of the vehicle 100 or a user-specified position and outputs the route to the control system 12. The route calculated by the navigation device 16 is stored in a route information storage unit 44 of a storage device 40 as route information.

The vehicle sensor 18 includes a speed sensor for detecting the speed of the vehicle 100 (the vehicle speed), an acceleration sensor for detecting an acceleration, a lateral G sensor for detecting lateral G, a yaw rate sensor detecting an angular velocity about a vertical axis, an orientation sensor for detecting orientation or direction, and an inclination sensor for detecting an inclination, and the vehicle sensor 18 outputs the detection signals from those sensors to the control system 12. The detection signals are stored in a host vehicle state information storage unit 46 of the storage device 40 as host vehicle state information Ivh.

The communication device 20 is configured to be capable of communication with external devices including roadside equipment, other vehicles, and servers, and sends and receives information on traffic equipment, information on other vehicles, probe information, or the latest map information, for example. The map information is stored in the navigation device 16 and also in a map information storage unit 42 of the storage device 40 as map information.

The operation device 24 includes an accelerator pedal, a steering wheel (a hand wheel), a brake pedal, a shift lever, and a direction indication lever. The operation device 24 is equipped with the operation detection sensor 26 for detecting whether an operation is being performed by the driver or not, the amount of operation, and the position of operation.

The operation detection sensor 26 outputs the amount of accelerator pressing (accelerator opening), the amount of steering wheel operation (the amount of steering), the amount of brake pressing, the shift position, a right or left turn direction, and the like to a vehicle control unit 60 as detection results.

The automated driving switch 22 is, for example, a push button switch provided on an instrument panel for users including the driver to switch between a non-automated driving mode (manual driving mode) and an automated driving mode by manual operation.

In this embodiment, settings are such that the mode is switched between the automated driving mode and the non-automated driving mode every time the automated driving switch 22 is pressed. Alternatively, for more reliable confirmation of the driver's intention for automated driving, settings may be such that the mode switches from the non-automated driving mode to the automated driving mode when the automated driving switch 22 is pressed twice and from the automated driving mode to the non-automated driving mode when the automated driving switch 22 is pressed once, for example.

The automated driving mode is a driving mode in which the vehicle 100 travels under control of the control system 12 without the driver manipulating the operation device 24 (specifically, the accelerator pedal, the steering wheel, and the brake pedal). In other words, the automated driving mode is a driving mode in which the control system 12 controls some or all of the driving force device 28, the steering device 30, and the braking device 32 based on a sequentially determined action plan (in a short term, a short-term trajectory St as discussed later).

If the driver starts manipulating the operation device 24 during the automated driving mode, the automated driving mode is automatically canceled to switch to the non-automated driving mode (manual driving mode).

<1.3 Specific Configuration of Output Device>

The driving force device 28 is composed of a driving force electronic control unit (ECU) and a driving source including an engine and a drive motor. The driving force device 28 generates travel driving force (torque) for the traveling of the vehicle 100 in accordance with a vehicle control value Cvh input from the vehicle control unit 60 and transmits the force to the wheels via a transmission or directly.

The steering device 30 is composed of an electric power steering system (EPS) ECU and an EPS device. The steering device 30 changes the orientation of the wheels (drive wheels) in accordance with the vehicle control value Cvh input from the vehicle control unit 60.

The braking device 32 is an electric servo brake used together with a hydraulic brake, for example, and is composed of a brake ECU and a brake actuator. The braking device 32 brakes the wheels in accordance with the vehicle control value Cvh input from the vehicle control unit 60.

<1.4 Configuration of Control System 12>

The control system 12 is composed of one or more ECUs and includes various functional components as well as the storage device 40 and the like. The functional components in this embodiment are software functional components whose functions are implemented by execution of programs stored in the storage device 40 by a central processing unit (CPU); however, the functional components may be configured by hardware functional components composed of an integrated circuit and the like.

The control system 12 includes, in addition to the storage device 40 and the vehicle control unit 60, an outdoor recognition unit 52 (a road environment recognition unit, an obstacle recognition unit), a recognition result receiving unit 53, a local environment map generation unit 54, an overall control unit 70, a long-term trajectory generation unit 71, a middle-term trajectory generation unit 72, and a short-term trajectory generation unit 73. The overall control unit 70 centrally controls the individual units by controlling task synchronization among the recognition result receiving unit 53, the local environment map generation unit 54, the long-term trajectory generation unit 71, the middle-term trajectory generation unit 72, and the short-term trajectory generation unit 73.

The outdoor recognition unit 52, with reference to the host vehicle state information Ivh from the vehicle control unit 60 and based on outside information (including image information) from the external environment sensor 14, recognizes a road environment including lane markings (white lines) on the opposite sides of the vehicle 100 and generates "static" outdoor recognition information including regions where travel is possible, and the distance to a stop line and a drivable zone.

At the same time, the outdoor recognition unit 52 also generates "dynamic" outdoor recognition information such as on obstacles (including parked or stopped vehicles), traffic participants (persons and other vehicles), and traffic light colors {blue (green), yellow (orange), red}, based on the outside information from the external environment sensor 14.

The static and dynamic outdoor recognition information are each stored in an outdoor recognition information storage unit 45 of the storage device 40 as outdoor recognition information Ipr.

The recognition result receiving unit 53, in response to a computation command Aa, outputs the outdoor recognition information Ipr received within a predetermined computation cycle Toc (the reference cycle or reference computation cycle) to the overall control unit 70 with the count value of an update counter. The computation cycle Toc is a reference computation cycle within the control system 12, being set to a value on the order of several tens ms, for example.

The local environment map generation unit 54, in response to a computation command Ab from the overall control unit 70, generates local environment map information Iem within the computation cycle Toc with reference to the host vehicle state information Ivh and outdoor recognition information Ipr, and outputs the local environment map information Iem to the overall control unit 70 with the count value of an update counter. That is to say, at the start of control, a computation cycle of 2×Toc is required before the local environment map information Iem is generated.

The local environment map information Iem is information representing the travel environment of the vehicle 100 (FIGS. 5 to 8) as a map; roughly speaking, it is information produced by adding the host vehicle state information Ivh and an ideal travel line 112 to the outdoor recognition information Ipr. The local environment map information Iem is stored in a local environment map information storage unit 47 of the storage device 40. The ideal travel line 112 refers to an ideal travel route for the vehicle 100 to smoothly travel on the lane 102, and the travel route refers to a point sequence (x, y) of a route that is not time-dependent and represents a geometrical straight line or curve followed by the vehicle 100.

The long-term trajectory generation unit 71, in response to a computation command Ac from the overall control unit 70, generates a long-term trajectory Lt in a relatively longest computation cycle (for example, 9×Toc) with reference to the local environment map information Iem (utilizing only the static components of the outdoor recognition information Ipr), the host vehicle state information Ivh, and a road map (for example, the curvatures of curves) stored in the map information storage unit 42. Then, the long-term trajectory generation unit 71 outputs the generated long-term trajectory Lt to the overall control unit 70 with the count value of an update counter. The long-term trajectory Lt is stored in a trajectory information storage unit 48 of the storage device 40 as trajectory information It.

The middle-term trajectory generation unit 72, in response to a computation command Ad from the overall control unit 70, generates a middle-term trajectory Mt within a relatively medium computation cycle (for example, 3×Toc) with reference to the local environment map information Iem (utilizing both the dynamic and static components of the outdoor recognition information Ipr), the host vehicle state information Ivh, and the long-term trajectory Lt. Then, the middle-term trajectory generation unit 72 outputs the generated middle-term trajectory Mt to the overall control unit 70 with the count value of an update counter. The middle-term trajectory Mt is stored in the trajectory information storage unit 48 as trajectory information Ir in a manner similar to the long-term trajectory Lt.

The short-term trajectory generation unit 73, in response to a computation command Ae from the overall control unit 70, generates a short-term trajectory St within a relatively shortest computation cycle (for example, Toc) with reference to the local environment map information Iem (utilizing both the dynamic and static components of the outdoor recognition information Ipr), the host vehicle state information Ivh, the long-term trajectory Lt, and the middle-term trajectory Mt. Then, the short-term trajectory generation unit 73 outputs the generated short-term trajectory St to the overall control unit 70 and to the vehicle control unit 60 simultaneously with the count value of an update counter. The short-term trajectory St is stored in the trajectory information storage unit 48 as trajectory information Ir in a manner similar to the long-term trajectory Lt and middle-term trajectory Mt.

The long-term trajectory Lt indicates a trajectory for a traveling time of, for example, about 10 seconds and is a trajectory that prioritizes the ride quality and comfort. The short-term trajectory St indicates a trajectory for a traveling time of, for example, about 1 second and is a trajectory that prioritizes the achieving of vehicle dynamics and ensuring of safety. The middle-term trajectory Mt indicates a trajectory for a traveling time of, for example, about 5 seconds and is an intermediate trajectory relative to the long-term trajectory Lt and the short-term trajectory St.

The short-term trajectory St is equivalent to a data set indicative of the target behavior of the vehicle 100 for each short cycle Ts (=Toc). The short-term trajectory St is a trajectory point sequence Pj (x, y, θz, vs, va, ρ, γ, δst) with the data unit being position x in the vertical direction (X-axis), position y in the horizontal direction (Y-axis), orientation angle θz, speed vs, acceleration va, curvature ρ, yaw rate γ, and steering angle δst, for example. The long-term trajectory Lt or the middle-term trajectory Mt is a data set defined in a similar manner to the short-term trajectory St, though with different cycles. Thus, a travel trajectory (a trajectory point sequence Pj) is temporally constrained and its length can be short in some cases. As opposed, for the travel route (point sequence (x, y)), a route with a certain length can be generated within a predetermined travel environment of the vehicle 100.

The vehicle control unit 60 determines a vehicle control value Cvh that allows traveling of the vehicle 100 according to behaviors specified with the short-term trajectory St (a trajectory point sequence Pj) and outputs the resulting vehicle control value Cvh to the driving force device 28, the steering device 30, and the braking device 32.

<1.5 Principal Features>

Figure 2:
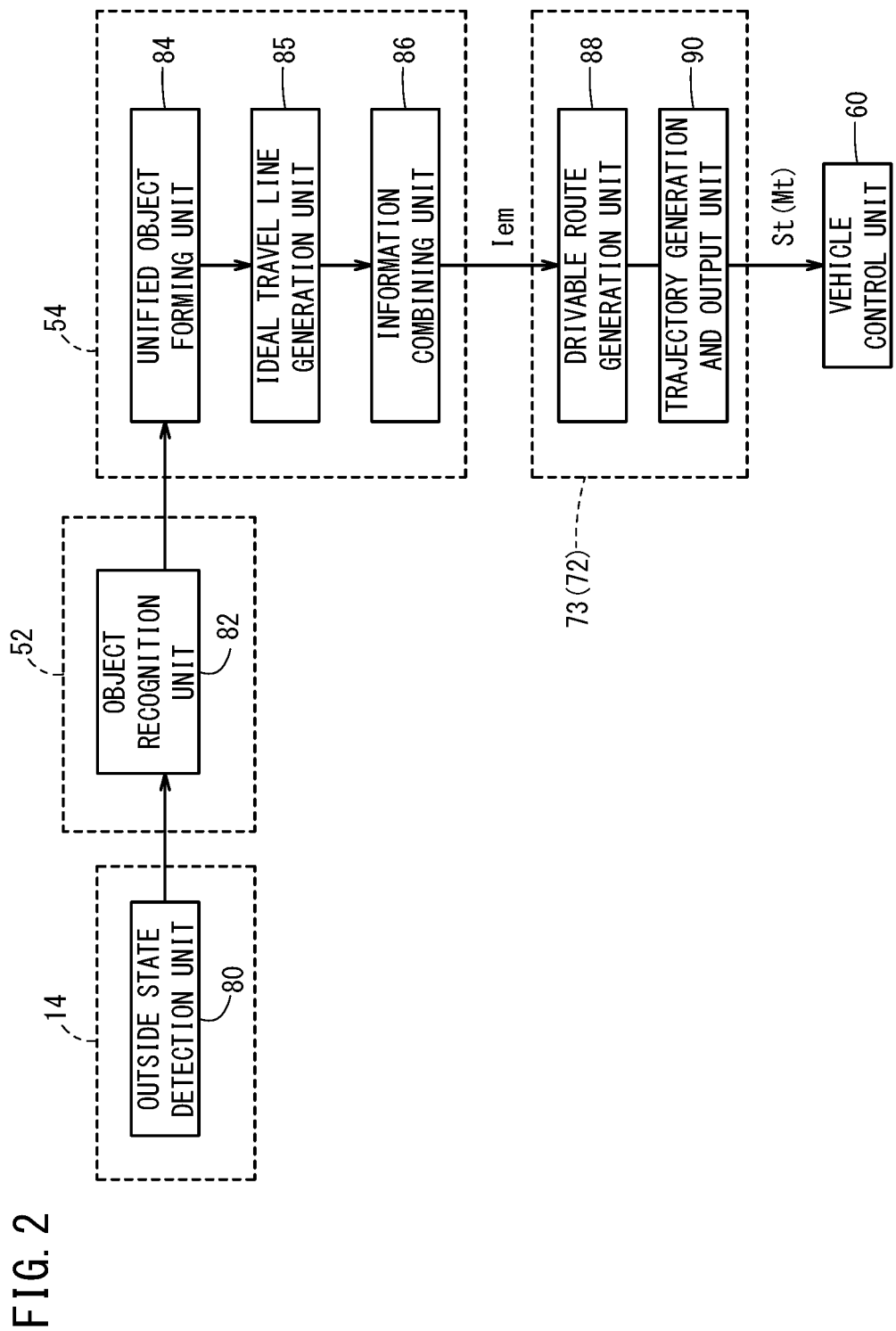
FIG. 2 is a functional block diagram showing key features of the vehicle control device of FIG. 1.

FIG. 2 is a functional block diagram showing principal features in the vehicle control device 10 of FIG. 1. The vehicle control device 10 includes an outside state detection unit 80, an object recognition unit 82, a unified object forming unit 84, an ideal travel line generation unit 85, an information combining unit 86, a drivable route generation unit 88, a trajectory generation and output unit 90, and a vehicle control unit 60.

The outside state detection unit 80 corresponds to the external environment sensor 14 shown in FIG. 1 and detects the outside state of the vehicle 100. The object recognition unit 82 corresponds to the outdoor recognition unit 52 shown in FIG. 1 and recognizes one or more objects by applying a well-known recognition technique to a detection result obtained by the outside state detection unit 80.

The unified object forming unit 84, the ideal travel line generation unit 85, and the information combining unit 86 correspond to the local environment map generation unit 54 shown in FIG. 1. The unified object forming unit 84 unifies particular objects out of multiple objects using the outdoor recognition information Ipr including the recognition result obtained by the object recognition unit 82, and the host vehicle state information Ivh associated with the vehicle 100. The ideal travel line generation unit 85 generates the ideal travel line 112 for the vehicle 100 (FIGS. 5 to 8) with information from the object recognition unit 82. The information combining unit 86 creates local environment map information Iem by combining the ideal travel line 112 generated by the ideal travel line generation unit 85 with the outdoor recognition information Ipr including information on objects outside the vehicle 100 (hereinafter, object information) or information on lanes (hereinafter, traffic lane information).

The drivable route generation unit 88 and the trajectory generation and output unit 90 correspond to the short-term trajectory generation unit 73 (or the middle-term trajectory generation unit 72). The drivable route generation unit 88 generates a travel route 114 (a drivable route) along which the vehicle 100 is able to travel while avoiding interference with obstacle areas ahead (for example, obstacle areas 106a-106i shown in FIGS. 6 to 8), calculates a distance-to-collision for avoiding a collision between the obstacle areas and the vehicle 100 based on the generated travel route 114, and calculates a target speed of the vehicle 100 for avoiding a collision with the obstacle areas using the calculated distance-to-collision. The trajectory generation and output unit 90 generates a travel trajectory (for example, the short-term trajectory St of the trajectory point sequence Pj) corresponding to the travel route 114 for avoiding a collision with the obstacle areas based on the target speed calculated by the drivable route generation unit 88, and outputs the generated travel trajectory to the vehicle control unit 60.

2. OPERATION OF VEHICLE CONTROL DEVICE 10

Figure 3:
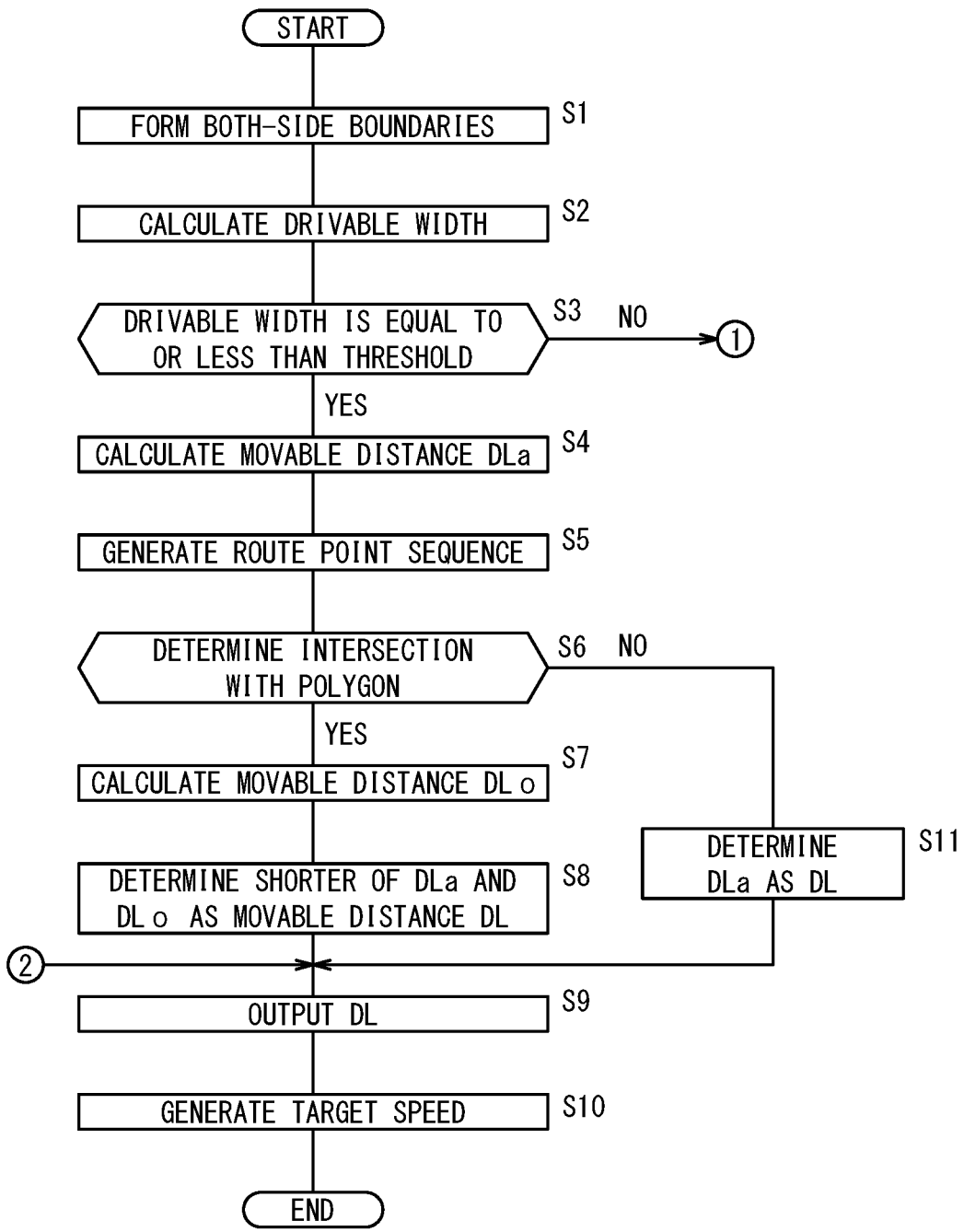
FIG. 3 is a flowchart for reference in description of the operation of the functional block diagram shown in FIG. 2.
Figure 4:
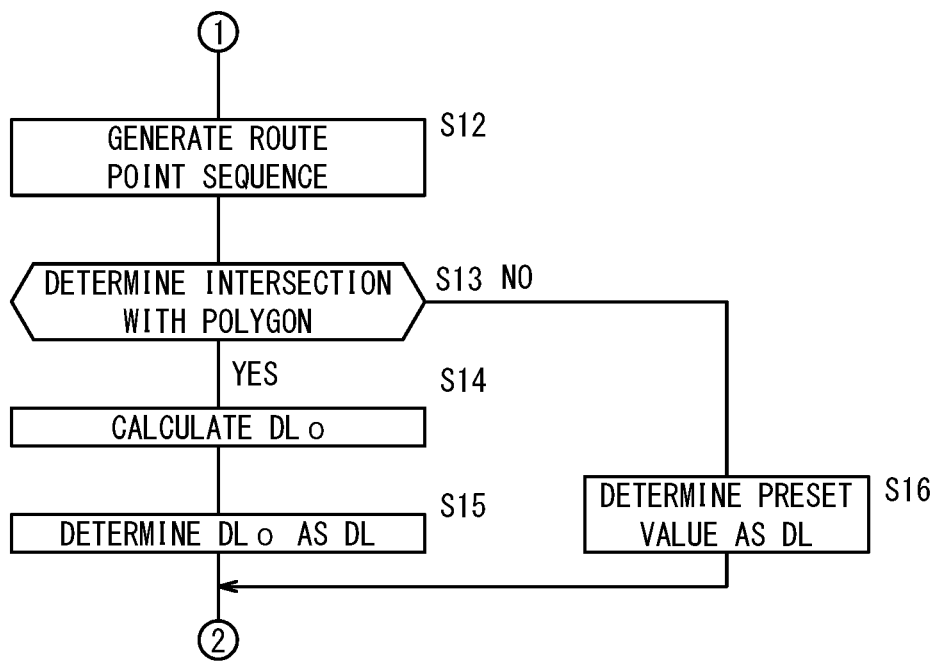
FIG. 4 is a flowchart for reference in description of the operation of the functional block diagram shown in FIG. 2.

The vehicle control device 10 in this embodiment is configured as described above. Next, the operation of the vehicle control device 10 (the functional block diagram shown in FIG. 2 in particular) is described with reference to FIGS. 3 to 8. FIGS. 3 and 4 are a flowchart used to explain the operation of the drivable route generation unit 88 and the trajectory generation and output unit 90, which correspond to the short-term trajectory generation unit 73 (or the middle-term trajectory generation unit 72), in the functional block diagram of FIG. 2. FIGS. 5 to 8 are diagrams illustrating cases where the vehicle 100 travels on the lane 102 (the travel lane) in a virtual space 104.

2.1 Operation of the Outside State Detection Unit 80, Outdoor Recognition Unit 52, and Local Environment Map Generation Unit 54

The outside state detection unit 80 (specifically, the cameras 33 or the radars 34) detects the outside state of the vehicle 100. The outside state detection unit 80 detects the state ahead in the direction of travel on the lane 102 which is being traveled by the vehicle 100 shown in FIGS. 5 to 8. Then, the object recognition unit 82 of the outdoor recognition unit 52 recognizes one or more objects (obstacles such as other vehicles) present ahead of the vehicle 100 in the direction of travel by applying a well-known recognition technique to the detection result from the outside state detection unit 80.

Figure 5:
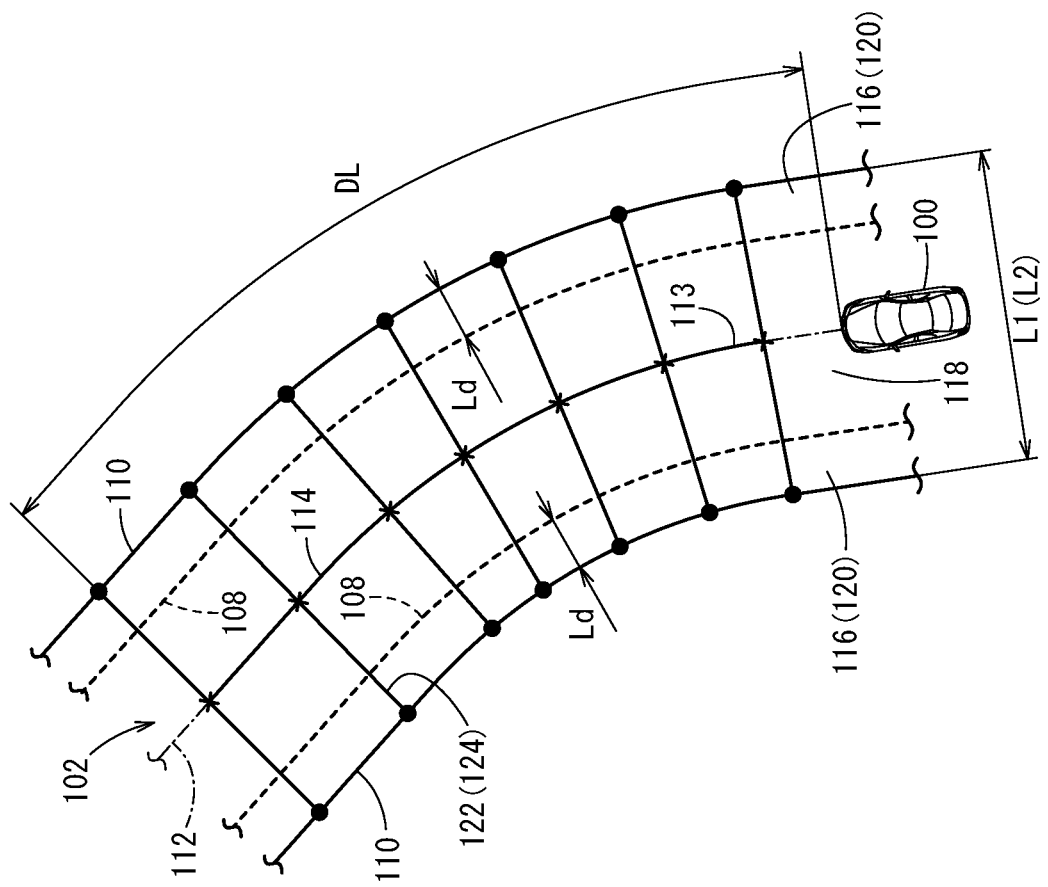
FIG. 5 is a diagram showing the traveling of a vehicle when no obstacle is present.
Figure 6:
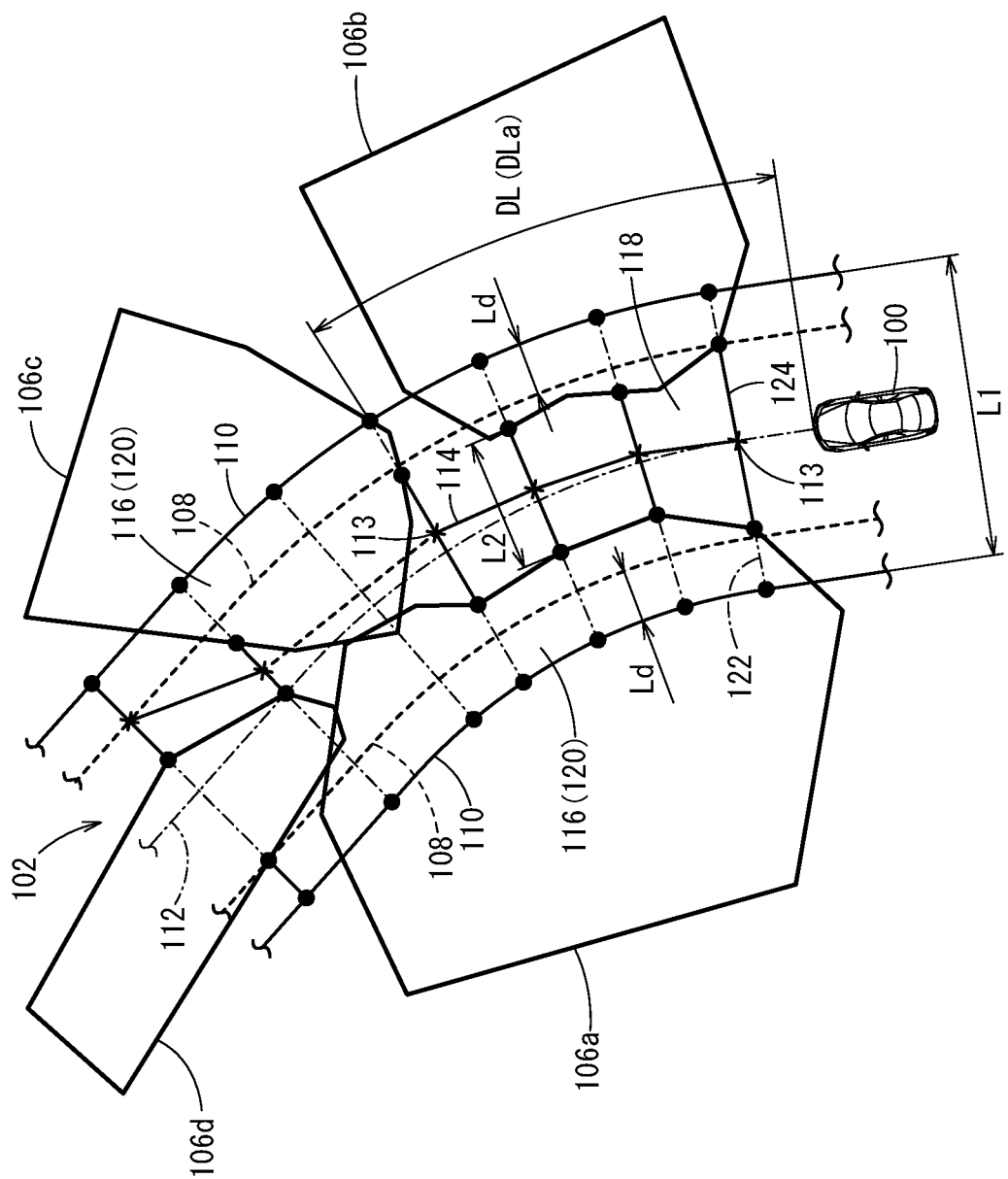
FIG. 6 is a diagram showing the traveling of a vehicle when obstacles are present.
Figure 7:
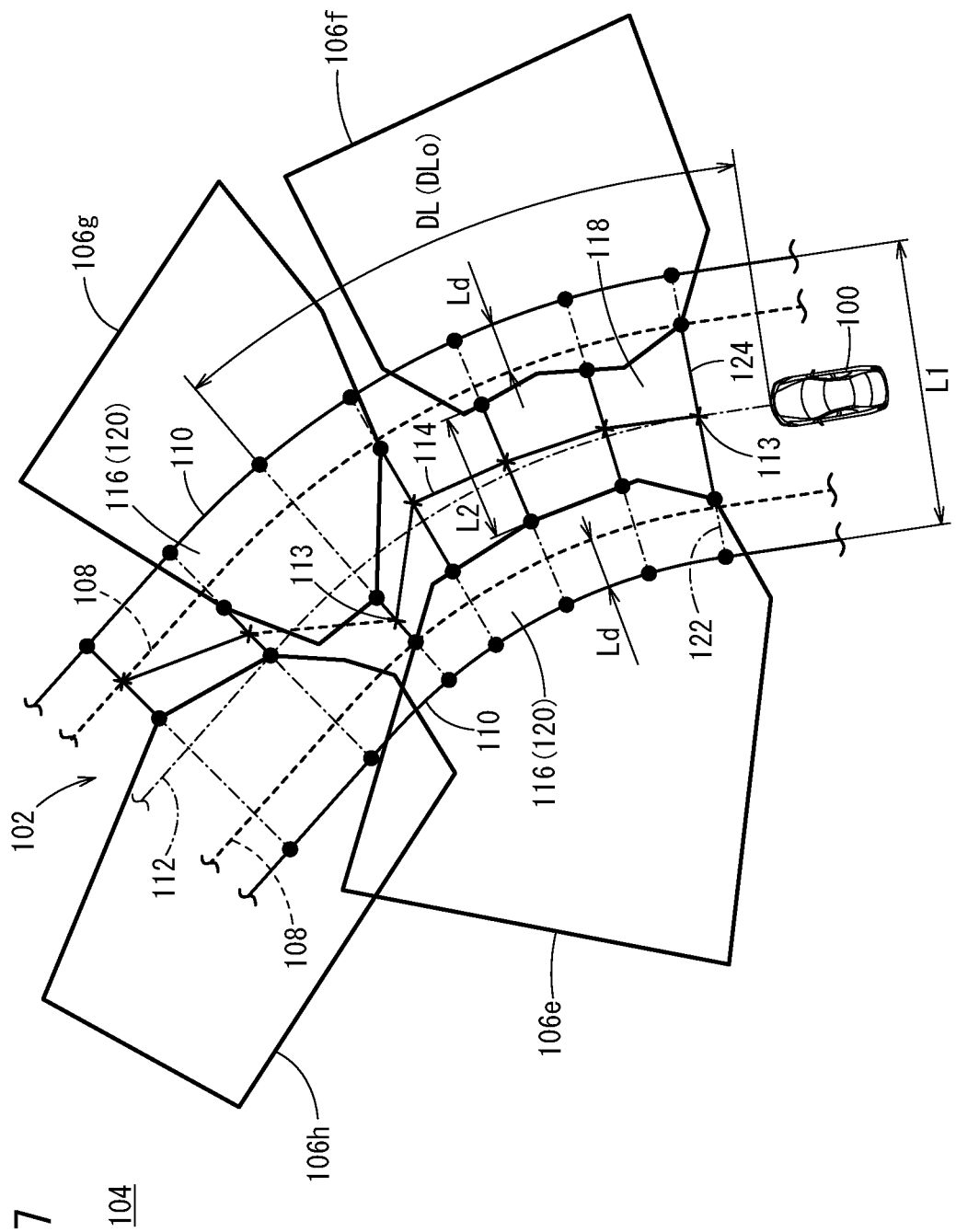
FIG. 7 is a diagram showing the traveling of a vehicle when obstacles are present.
Figure 8:
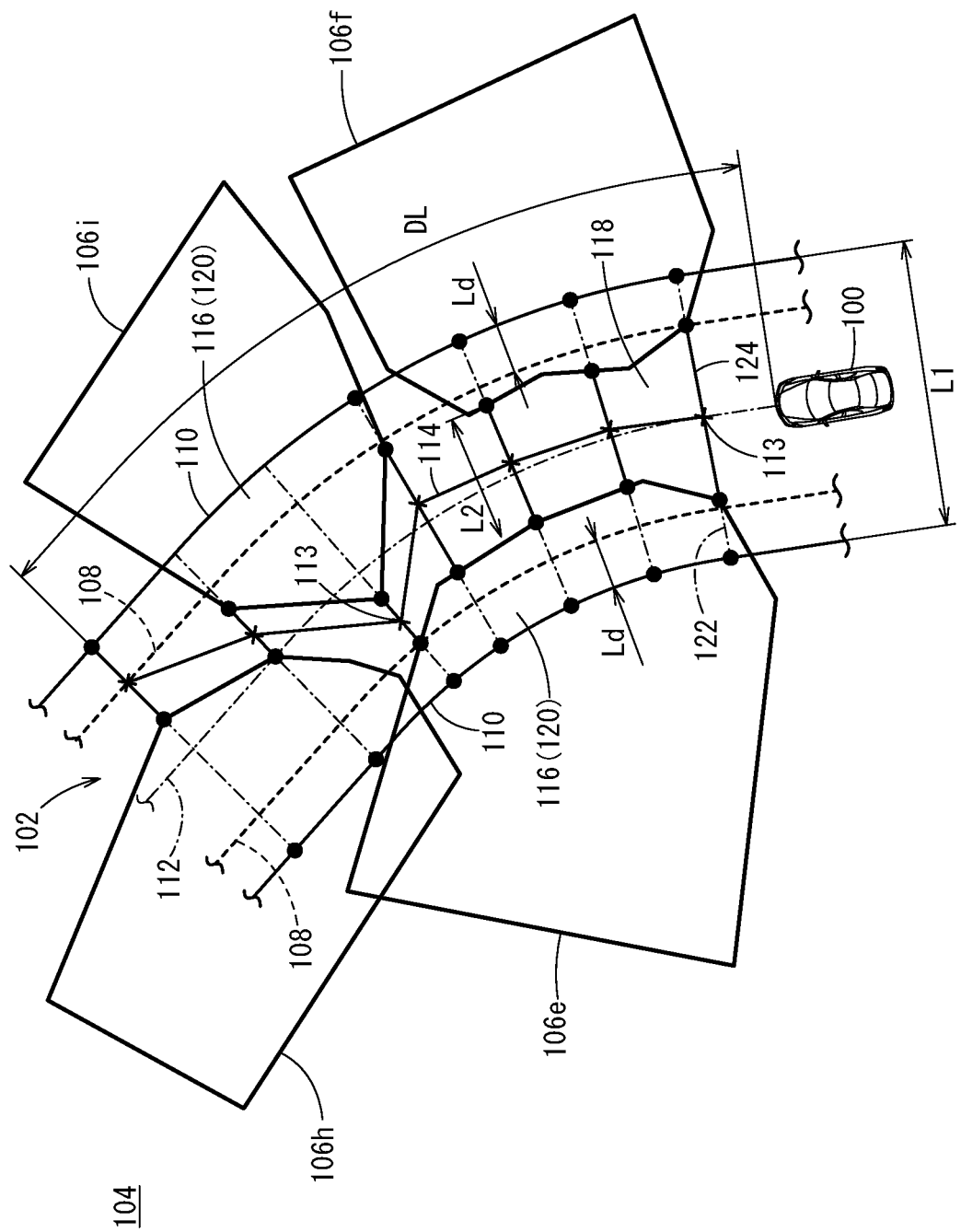
FIG. 8 is a diagram showing the traveling of a vehicle when obstacles are present.

The virtual space 104 shown in FIGS. 5 to 8 is a planar space defined by a local coordinate system with the position and posture of the vehicle 100 being a reference. FIG. 5 shows a case where obstacle areas indicative of obstacles are not present on the lane 102 whereas FIGS. 6 to 8 show cases where obstacle areas 106a-106i indicative of obstacles are present on the lane 102. The obstacle areas 106a-106i are discussed later.

The object recognition unit 82 recognizes, for example, both-side boundaries 108 representing lane markings (white lines) and/or road structures 110 such as guardrails in the virtual space 104. For simplifying the description, FIGS. 5 to 8 show the curved lane 102 where the both-side boundaries 108 are illustrated with broken curved lines and the road structures 110 are illustrated with solid curved lines.

The dot-dashed line passing through the center position of the lane 102 indicates the ideal travel line 112 along which the vehicle 100 will travel without the obstacle areas 106a-106i. That is, the ideal travel line 112 is an ideal travel route for the vehicle 100 to smoothly travel on the lane 102. While the ideal travel line 112 in FIGS. 5 to 8 is set as a travel route coinciding with the centerline of the lane 102, the ideal travel line 112 may be a route different from the centerline. The ideal travel line 112 may also be a preset travel route.

The unified object forming unit 84 recognizes one or more objects (for example, other vehicles) present ahead of the vehicle 100 in the direction of travel as obstacles and generates obstacle areas 106a-106i of polygon shapes containing the recognized obstacles. In this case, for the one or more objects recognized by the object recognition unit 82, the obstacle areas 106a-106i of polygon shapes may be generated by containing all of two or more objects (obstacles) that are present within a predetermined distance range, for example.

Accordingly, in the virtual space 104, portions of three obstacle areas 106a, 106c, 106d may overlap each other in the case of FIG. 6 and portions of two obstacle areas 106e, 106h may overlap each other in the cases of FIGS. 7 and 8. The shapes of the polygons forming the obstacle areas 106a-106i are generated with the sizes of the obstacles and/or the size of the vehicle 100 (the width of the vehicle body) taken into consideration.

In FIGS. 5 to 8, the several "X" marks indicate individual target points 113 forming the point sequence (x, y) of a route, and the travel route 114 that can be followed by the vehicle 100 is generated by connecting the target points 113 with segments. As discussed later, the target points 113 are generated in sequence along the direction of travel of the vehicle 100 by the drivable route generation unit 88 performing the process of FIGS. 3 and 4 at intervals of a predetermined time (for example, per computation cycle Toc) or at intervals of a predetermined distance (at each interval between target points 113). The target points 113 are connected with segments every time the process is performed, thereby generating a travel route 114 extending forward in the direction of travel from the position of the vehicle 100. The point sequence (x, y) formed by the target points 113 is positioned with the length of the vehicle 100 taken into consideration.

The ideal travel line generation unit 85 generates an ideal travel line 112 that the vehicle 100 is able to follow in the absence of the obstacle areas 106a-106i. Subsequently, the information combining unit 86 combines the ideal travel line 112 generated by the ideal travel line generation unit 85 with the outdoor recognition information Ipr to create the local environment map information Iem.

2.2 General Description of Drivable Route Generation Unit 88 and Trajectory Generation and Output Unit 90

The drivable route generation unit 88 determines the possibility of interference between the vehicle 100 and the obstacle areas 106a-106i at intervals of the predetermined time or the predetermined distance using information from the local environment map generation unit 54 and the like, and generates, based on the result of determination, the travel route 114 which the vehicle 100 is able to follow while avoiding interference with the obstacle areas 106a-106i. The trajectory generation and output unit 90 generates a travel trajectory for the vehicle 100 based on the travel route 114 generated by the drivable route generation unit 88 and outputs the travel trajectory to the vehicle control unit 60.

FIGS. 3 and 4 are a flowchart for mainly describing the determination of the possibility of interference between the vehicle 100 and the obstacle areas 106a-106i by the drivable route generation unit 88 and the generation of the travel route 114 based on the result of the determination. This flowchart shows a process applicable to the examples of FIGS. 5 to 8.

Accordingly, in describing the operation of the drivable route generation unit 88 and the trajectory generation and output unit 90, the process of the flowchart in FIGS. 3 and 4 is described first with reference to some of the features of the examples of FIGS. 5 to 8. Next, it is explained how the flowchart of FIGS. 3 and 4 is applied to each of the examples of FIGS. 5 to 8. The present description illustrates a case where the vehicle 100 travels forward in the direction of travel (counterclockwise in FIGS. 5 to 8) within the virtual space 104 of FIGS. 5 to 8 and where the drivable route generation unit 88 generates the travel route 114 by iteratively performing the process of FIGS. 3 and 4 at intervals of the predetermined time or the predetermined distance.

2.3 Description of the Flowchart of FIGS. 3 and 4

At step S1, with regard to information on the both-side boundaries 108, the drivable route generation unit 88 reforms the both-side boundaries 108 in the virtual space 104 taking into account a deviation tolerance distance Ld which is a distance in the width direction of right and left road shoulders 116 on the lane 102. As a result, a central portion of the lane 102 between the both-side boundaries 108 is formed as a basic travel range 118 where the vehicle 100 can travel during a normal time when the obstacle areas 106a-106i are not present, whereas portions outside the basic travel range 118 are formed as deviation tolerance ranges 120 corresponding to the road shoulders 116 and each having a width of the deviation tolerance distance Ld. Since the object recognition unit 82 can recognize the both-side boundaries 108 as mentioned above, it is possible for the object recognition unit 82 to recognize the basic travel range 118 and the deviation tolerance ranges 120 beforehand.

A segment that is orthogonal to the direction of travel of the vehicle 100 (the direction along the ideal travel line 112) and has a length of a width L1 of the lane 102 indicates a segment in the lane-width direction (hereinafter, also called a first drivable zone 122), indicative of a distance (zone) in the width direction within which the vehicle 100 is able to travel when the obstacle areas 106a-106i are not present on the lane 102. The first drivable zone 122 is also the distance between the right and left road structures 110.

At the next step S2, the drivable route generation unit 88 calculates a drivable width L2, indicating a range within which the vehicle 100 can actually travel in the width direction of the lane 102 (hereinafter, also called a second drivable zone 124).

For example, in the case of FIG. 5, the obstacle areas 106a-106i are not present, so that the width L1 of the lane 102 will be the drivable width L2 (L1=L2). That is, in the case of FIG. 5, the first drivable zone 122 and the second drivable zone 124 coincide with each other.

By contrast, in the cases of FIGS. 6 to 8, obstacle areas 106a-106i are present on the lane 102. Thus, the drivable route generation unit 88 calculates the drivable width L2 of the second drivable zone 124 by subtracting the width-direction lengths of portions of the obstacle areas 106a-106i that fall within the lane 102 from the length L1 corresponding to the first drivable zone 122. For example, in FIG. 6, the drivable width L2 at the target point 113 closest to the vehicle 100 is the distance between the left and right obstacle areas 106a and 106b, which equals the width L1 of the first drivable zone 122 minus the widths of portions of the obstacle areas 106a, 106b that overlap the lane 102. In FIGS. 6 to 8, the first drivable zone 122 is shown as a dot-dashed line orthogonal to the ideal travel line 112.

At the next step S3, the drivable route generation unit 88 determines whether the drivable width L2 of the second drivable zone 124 is equal to or less than a predetermined threshold Lth (L2≤Lth). Here, the threshold Lth is set to a drivable width that prevents the vehicle 100 from moving forward in the direction of travel, more specifically, a width that takes into account the width of the vehicle 100 plus a predetermined margin.

When L2≤Lth (step S3: YES), the flow moves on to the next step S4. At step S4, the drivable route generation unit 88 determines that the vehicle 100 is unable to move forward through the second drivable zone 124 used for the current determination, and calculates the distance from the current position of the vehicle 100 to (the target point 113 of) the immediately preceding second drivable zone 124 that was used in the previous processing, as the distance that the vehicle 100 can travel from its current position (a movable distance DLa).

For example, as shown in FIG. 6, two obstacle areas 106a and 106c overlap at the location of the fifth first drivable zone 122 ahead of the vehicle 100 in the direction of travel, preventing the vehicle 100 from going through there. Accordingly, the drivable route generation unit 88 calculates, as the movable distance DLa, the distance to the target point 113 that corresponds to the fourth first drivable zone 122 and fourth second drivable zone 124 ahead of the vehicle 100.

At the next step S5, a point sequence (x, y) of the route over the movable distance DLa is generated on the lane 102. Since the drivable route generation unit 88 performs the process of FIGS. 3 and 4 at intervals of the predetermined distance or the predetermined time as mentioned earlier, the new target point 113 obtained in the current processing is added to the target points 113 that have been obtained in the processing so far, whereby the point sequence (x, y) is generated. In this example, the target point 113 may be set to the center point of the second drivable zone 124 in the width direction.

At step S6, the drivable route generation unit 88 determines whether the travel route 114 formed by connecting the point sequence (x, y) (target points 113) generated at step S5 intersects any of the obstacle areas 106a-106i or not. That is, the travel route 114 at this stage is merely a point sequence (x, y) for determining possible intersection with the obstacle areas 106a-106i.

If a portion of the travel route 114 intersects any of the obstacle areas 106a-106i (step S6: YES), the flow moves on to the next step S7. At step S7, the drivable route generation unit 88 calculates the distance from the current position of the vehicle 100 to the target point 113 that immediately precedes the point of intersection as the distance that the vehicle 100 can travel (a movable distance DLo).

For example, as shown in FIG. 7, the travel route 114 intersects the obstacle area 106g between the fifth target point 113 and the sixth target point 113 ahead of the vehicle 100 in the direction of travel. This means the vehicle 100 cannot go through this section. Thus, the drivable route generation unit 88 calculates the distance from the vehicle 100 to the fifth target point 113 as the movable distance DLo.

At the next step S8, the drivable route generation unit 88 confirms (determines) the shorter one of the movable distance DLa calculated at step S4 and the movable distance DLo calculated at step S7 as the distance that can be actually traveled from the current position of the vehicle 100 (a movable distance DL). That is, the drivable route generation unit 88 can determine a distance corresponding to the travel route 114 appropriate for making the vehicle 100 travel forward, and output the determined distance as the movable distance DL that is used for the generation of the target speed at the next step S10 (step S9).

Then, at step S10, the drivable route generation unit 88 uses the determined movable distance DL to calculate the target speed of the vehicle 100 from the current position of the vehicle 100. That is, the movable distance DL is a distance-to-collision for avoiding a collision between an obstacle area ahead and the vehicle 100, and the drivable route generation unit 88 uses this distance-to-collision to calculate a target speed for avoiding a collision with the obstacle area.

Meanwhile, if no portion of the travel route 114 intersects the obstacle areas 106a-106i at step S6 (step S6: NO), the flow moves on to step S11. At step S11, the drivable route generation unit 88 calculates the movable distance DLa as the movable distance DL that the vehicle 100 can actually travel.

That is, when the determination at step S6 gives a negative result, it is possible that DLo>DLa. In this case, if the movable distance DLo is adopted as the movable distance DL, it is possible from the result of the processing at steps S3 and S4 that the vehicle 100 interferes with the obstacle areas 106a-106i when the vehicle 100 travels beyond the movable distance DLa.

Accordingly, at step S11, given the possibility of interference between the vehicle 100 and the obstacle areas 106a-106i, the drivable route generation unit 88 selects (calculates) the movable distance DLa, shorter than the movable distance DLo, as the movable distance DL.

Thereafter, the drivable route generation unit 88 performs the processing at steps S9 and S10 using the calculated movable distance DL (movable distance DLa).

Back at step S3, when L2>Lth (step S3: NO), the flow moves on to the next step S12. At step S12, the drivable route generation unit 88 determines that the vehicle 100 is able to move forward through the second drivable zone 124 used for the current determination, and generates a point sequence (x, y) in a similar way to step S5. Also in this case, the drivable route generation unit 88 adds the new target point 113 obtained in the current processing to the target points 113 that have been obtained in the processing so far to generate the point sequence (x, y) because the process of FIGS. 3 and 4 have been executed at intervals of the predetermined distance or the predetermined time.

At the next step S13, the drivable route generation unit 88 determines in a similar way to step S6 whether the travel route 114 formed by connecting the point sequence (x, y) (target points 113) generated at step S12 intersects any of the obstacle areas 106a-106i or not.

If a portion of the travel route 114 intersects any of the obstacle areas 106a-106i (step S13: YES), the flow moves on to the next step S14. At step S14, the drivable route generation unit 88 calculates in a similar way to step S7 the distance from the current position of the vehicle 100 to the target point 113 that immediately precedes the point of intersection as the movable distance DLo.

At the next step S15, the drivable route generation unit 88 confirms (determines) the movable distance DLo calculated at step S14 as the movable distance DL. Thereafter, the drivable route generation unit 88 performs the processing at steps S9 and S10.

Meanwhile, if no portion of the travel route 114 intersects with the obstacle areas 106a-106i at step S13 (step S13: NO), the flow moves on to step S16. At step S16, the drivable route generation unit 88 determines a preset distance of the travel route 114 (a maximum distance) as the movable distance DL.

That is, the determination at step S13 will give a negative result when the obstacle areas 106a-106i are not present on the lane 102 as in FIG. 5 or when the travel route 114 is generated so as to avoid the obstacle areas 106e, 106f, 106h, 106i as in FIG. 8. In such a case, the preset maximum distance is determined as the movable distance DL. Then, the drivable route generation unit 88 uses the determined movable distance DL to perform the processing at steps S9 and S10.

By thus repeating the process of FIGS. 3 and 4 at intervals of the predetermined time or the predetermined distance, the drivable route generation unit 88 can generate the optimal travel route 114 for allowing the vehicle 100 to travel forward while avoiding collisions with the obstacle areas 106a-106i.

Then, the trajectory generation and output unit 90 generates a travel trajectory (for example, the short-term trajectory St of the trajectory point sequence Pj) corresponding to the travel route 114 (the target speed) using the local environment map information Iem, host vehicle state information Ivh, and long-term trajectory Lt. In this case, the trajectory generation and output unit 90 may perform similar collision determination to that performed by the drivable route generation unit 88 on the travel trajectory. The trajectory generation and output unit 90 outputs the generated travel trajectory (the trajectory point sequence Pj for the short-term trajectory St) to the vehicle control unit 60. The vehicle control unit 60 determines the vehicle control value Cvh according to the short-term trajectory St (the trajectory point sequence Pj) generated by the trajectory generation and output unit 90, and controls the behavior of the vehicle 100 based on the determined vehicle control value Cvh.

2.4 Application to the Examples of FIGS. 5 to 8

The processing performed by the drivable route generation unit 88 and the trajectory generation and output unit 90 has been described above. Next, the examples of FIGS. 5 to 8 will be described in relation to FIGS. 3 and 4.

In the example of FIG. 5, the obstacle areas 106a-106i are not present on the lane 102. Also, the drivable width L2 of the second drivable zone 124 is the same as the width L1 of the first drivable zone 122 and thus is sufficiently greater than the threshold Lth.

Thus, for the example of FIG. 5, the drivable route generation unit 88 repetitively executes, at intervals of the predetermined time or the predetermined distance, the process of determining the possibility of interference between the vehicle 100 and the obstacle areas 106a-106i and the process of generating the travel route 114 in the order of S1→S2→S3 (step S3: NO)→S12→S13 (step S13: NO)→S16→S9→S10, which are shown in FIGS. 3 and 4.

As a result, as shown in FIG. 5, the travel route 114 is generated along the ideal travel line 112 in the basic travel range 118, and a travel trajectory is generated based on the travel route 114. The behavior of the vehicle 100 is then controlled according to the generated travel trajectory, whereby the vehicle 100 travels forward in the direction of travel on the ideal travel line 112.

In the example of FIG. 6, obstacle areas 106a-106d are present on the lane 102 where portions of two obstacle areas 106a and 106c overlap each other ahead of the vehicle 100 in the direction of travel and portions of two obstacle areas 106a and 106d overlap each other ahead of the vehicle 100 in the direction of travel. Besides, the two obstacle areas 106a and 106c overlap such that they hinder the traveling of the vehicle 100.

Thus, for the example of FIG. 6, the drivable route generation unit 88 executes the process of determining the possibility of interference between the vehicle 100 and the obstacle areas 106a-106d and the process of generating the travel route 114 either in the order of S1→S2→S3 (step S3: YES)→S4→S5→S6 (step S6: NO)→S11→S9→S10, or in the order of S1→S2→S3 (step S3: YES)→S4→S5→S6 (step S6: YES)→S7→S8→S9→S10, which are shown in FIGS. 3 and 4.

As a result, the travel route 114 is generated in the basic travel range 118 so as to avoid the obstacle areas 106a-106d as shown in FIG. 6 and a travel trajectory is generated based on the travel route 114. The behavior of the vehicle 100 is then controlled according to the generated travel trajectory, whereby the vehicle 100 travels forward in the direction of travel on the ideal travel line 112. In the example of FIG. 6, however, the movable distance DL is up to the target point 113 preceding the location where the two obstacle areas 106a and 106c overlap and thus the vehicle 100 can travel to this target point 113 along the travel route 114.

In the example of FIG. 7, obstacle areas 106e-106h are present on the lane 102, where portions of two obstacle areas 106e and 106h overlap each other ahead of the vehicle 100 in the direction of travel and a portion of the obstacle area 106g intersects the travel route 114.

Thus, for the example of FIG. 7, the drivable route generation unit 88 repetitively executes the process of determining the possibility of interference between the vehicle 100 and the obstacle areas 106e-106h and the process of generating the travel route 114 either in the order of S1→S2→S3 (step S3: NO)→S12→S13 (step S13: YES)→S14→S15→S9→S10, or in the order of S1→S2→S3 (step S3: YES)→S4→S5→S6 (step S6: YES)→S7→S8→S9→S10, which are shown in FIGS. 3 and 4.

As a result, the travel route 114 is generated in the basic travel range 118 so as to avoid the obstacle areas 106e-106h as shown in FIG. 7 and a travel trajectory is generated based on the travel route 114. The behavior of the vehicle 100 is then controlled according to the generated travel trajectory, whereby the vehicle 100 travels forward in the direction of travel on the ideal travel line 112. In the example of FIG. 7, however, the movable distance DL is up to the target point 113 preceding the location where the travel route 114 intersects the obstacle area 106g, and the vehicle 100 can travel up to this target point 113 along the travel route 114.

In the example of FIG. 8, obstacle areas 106e, 106f, 106h, 106i are present on the lane 102, where portions of two obstacle areas 106e and 106h overlap each other ahead of the vehicle 100 in the direction of travel. However, the travel route 114 does not intersect the obstacle areas 106e, 106f, 106h, 106i, and L2≥Lth.

Thus, for the example of FIG. 8, the drivable route generation unit 88 executes, similar to the example of FIG. 5, the process of determining the possibility of interference between the vehicle 100 and the obstacle areas 106e, 106f, 106h, 106i and the process of generating the travel route 114 in the order of S1→S2→S3 (step S3: NO)→S12→S13 (step S13: NO)→S16→S9→S10, which are shown in FIGS. 3 and 4.

As a result, as shown in FIG. 8, the travel route 114 is generated in the basic travel range 118 so as to avoid the obstacle areas 106e, 106f, 106h, 106i, and the behavior of the vehicle 100 is controlled according to a travel trajectory that is based on the travel route 114, whereby the vehicle 100 travels forward in the direction of travel on the ideal travel line 112.

3. EFFECTS OF VEHICLE CONTROL DEVICE 10

As described above, a vehicle control device 10 includes [1] an outside state detection unit 80 for detecting an outside state of a vehicle 100, [2] an outdoor recognition unit 52 for recognizing a road environment based on a detection result obtained by the outside state detection unit 80 and for recognizing one or more obstacles based on the detection result obtained by the outside state detection unit 80, and [3] a short-term trajectory generation unit 73 (or a middle-term trajectory generation unit 72) for generating a travel trajectory along which the vehicle 100 is able to travel without interfering with the obstacles (for example, short-term trajectory St or middle-term trajectory Mt) based on the road environment and obstacles recognized by the outdoor recognition unit 52. In this case, [4] the short-term trajectory generation unit 73 (or the middle-term trajectory generation unit 72) generates a travel trajectory based on a travel route 114 that passes through a second drivable zone 124, the second drivable zone 124 being determined by subtracting obstacle areas 106a-106i indicative of the obstacles from a first drivable zone 122 for the vehicle 100 defined by the road environment.

With this configuration, the second drivable zone 124, which is a portion of the first drivable zone 122 that does not overlap the obstacle areas 106a-106i, is calculated by subtracting the obstacle areas 106a-106i from the first drivable zone 122. Then, the travel route 114 is generated so as to pass through the calculated second drivable zone 124 and a travel trajectory is generated based on the generated travel route 114. This makes it possible to generate the travel route 114 for avoiding interference between the vehicle 100 and obstacles after determining the possibility of such interference beforehand and to generate a travel trajectory based on the generated travel route 114 even when the trajectory length (the movable distance DL) is short, that is, in the case of a short-term trajectory St corresponding to a short movable distance DL.

A drivable route generation unit 88 of the short-term trajectory generation unit 73 (or the middle-term trajectory generation unit 72) may calculate the second drivable zone 124 by defining the first drivable zone 122 at intervals of a predetermined time or a predetermined distance and subtracting the obstacle areas 106a-106i from the first drivable zone 122 defined. This enables efficient determination of the possibility of interference between the vehicle 100 and obstacles and generation of the travel route 114 for avoiding interference, allowing efficient generation of a travel trajectory in the trajectory generation and output unit 90.

The first drivable zone 122 each represents a road width (width L1) through which the vehicle 100 can travel when the obstacle areas 106a-106i are not present, and the second drivable zone 124 each represents a road width (drivable width L2) through which the vehicle 100 can travel when the obstacle areas 106a-106i are present. In this case, the drivable route generation unit 88 generates (a travel trajectory corresponding to) the travel route 114 by setting a predetermined position in a width direction of the second drivable zone 124 as a target point 113 for the vehicle 100 and connecting the set target point 113 with preceding target points at intervals of the predetermined time or the predetermined distance. Thus, the travel route 114 for avoiding interference between the vehicle 100 and obstacles can be generated immediately after the possibility of such interference is determined.

In this case, the drivable route generation unit 88 sets a center point in the width direction of the second drivable zone 124 as the target point 113, thereby allowing the vehicle 100 to travel along a travel trajectory based on the travel route 114 without interfering with the obstacles.

The ideal travel line generation unit 85 generates an ideal travel line 112 that passes through a center position in a width direction of the first drivable zone 122 based on information from the object recognition unit 82. In this case, the drivable route generation unit 88 generates the travel route 114 so as to be approximate to the generated ideal travel line 112. The ideal travel line 112 is a travel route of the vehicle 100 that passes through the center position of the lane 102 when there is no obstacle. Thus, by generating the travel route 114 so as to be approximate to the ideal travel line 112 and generating a travel trajectory based on the generated travel route 114, the vehicle 100 can travel avoiding interference.

Further, when a second drivable zone 124 having a drivable width L2 equal to or less than a threshold Lth is present in a direction of travel of the vehicle 100, the drivable route generation unit 88 may calculate a distance from the vehicle 100 to that second drivable zone 124 as a movable distance DL (DLa) for the vehicle 100; or when the travel route 114 intersects any of the obstacle areas 106a-

106*i* in the direction of travel of the vehicle 100, the drivable route generation unit 88 may calculate, as a movable distance DL (DLo), a distance from the vehicle 100 to the second drivable zone 124 preceding a point of intersection. This enables a travel trajectory to be set based on the travel route 114 corresponding to the length of the movable distance DL up to the point preceding any of the obstacle areas 106*a*-106*i* in question. Thus, interference between the vehicle 100 and the obstacle can be reliably avoided. If travel is determined to be impossible by the two determination processes, the shorter distance may be selected to improve the accuracy of the determination result. Additionally, because a target speed for avoiding interference can be calculated from the movable distance DL, (a travel trajectory corresponding to) the travel route 114 for avoiding interference can easily be generated.

The outdoor recognition unit 52 recognizes, from information on both-side boundaries 108 or road structures 110 on a lane 102 for the vehicle 100 contained in the road environment, the lane 102 being divided into a basic travel range 118 in a width direction of the lane 102 and deviation tolerance ranges 120 outside the basic travel range 118. The drivable route generation unit 88 thereby can generate the travel route 114 with the basic travel range 118 during a normal time whereas the drivable route generation unit 88 can generate the travel route 114 with the deviation tolerance ranges 120 when the basic travel range 118 is of a certain width or less or when the obstacle areas 106*a*-106*i* are present near a center of the basic travel range 118 (the ideal travel line 112).

That is, as the vehicle 100 is made to travel on the lane 102 during a normal time where there are no obstacles on the lane 102, setting the travel route 114 in the basic travel range 118 can make the vehicle 100 travel along a travel trajectory corresponding to the basic travel range 118.

By contrast, when an obstacle is present on the lane 102, the vehicle 100 travels deviating from the center toward either one of the right and left road shoulders 116 of the lane 102 (the road shoulder 116 with a greater width). Thus, when the basic travel range 118 is of a certain width or less or when an obstacle is present near the center of the basic travel range 118, the travel route 114 is generated with the deviation tolerance ranges 120, and a travel trajectory is generated based on the generated travel route 114. The vehicle 100 thereby can travel while avoiding interference with the obstacle.

Further, the outdoor recognition unit 52 may also identify one or more objects present in the direction of travel of the vehicle 100 as the obstacles based on a detection result obtained by the outside state detection unit 80, and generate the obstacle areas 106*a*-106*i* of polygon shapes containing the identified obstacles. This enables efficient processing at the drivable route generation unit 88 by grouping obstacles into the obstacle areas 106*a*-106*i* even when multiple obstacles are present ahead of the vehicle 100 in the direction of travel.

The vehicle control device 10 may further include a vehicle control unit 60 for controlling the vehicle 100 with a travel trajectory (for example, short-term trajectory St) that is based on the travel route 114 generated by the drivable route generation unit 88, thus enabling efficient control of the behavior of the vehicle 100 using the travel trajectory.

4. SUPPLEMENTARY NOTE

It will be apparent that the present invention is not limited to the above embodiment but may be subjected to any modification as desired without departing from the scope of the invention.

The invention claimed is:

1. A vehicle control device comprising:
   an outside state detection unit that detects an outside state of a vehicle;
   a road environment recognition unit that recognizes a road environment based on a detection result obtained by the outside state detection unit;
   an obstacle recognition unit that recognizes one or more obstacles based on the detection result obtained by the outside state detection unit; and
   a trajectory generation unit that generates a travel trajectory along which the vehicle is able to travel without interfering with the obstacles based on the road environment recognized by the road environment recognition unit and the obstacles recognized by the obstacle recognition unit, wherein
   the trajectory generation unit generates, at intervals of a predetermined time or a predetermined distance, the travel trajectory that passes through a second drivable zone, the second drivable zone being determined by subtracting obstacle areas indicative of the obstacles from a first drivable zone for the vehicle defined by the road environment,
   the first drivable zone is each of a road width through which the vehicle is allowed to travel when the obstacle areas are not present,
   the second drivable zone is each of a road width through which the vehicle is allowed to travel when the obstacle areas are present,
   the trajectory generation unit generates the travel trajectory by setting a predetermined position in a width direction of the second drivable zone as a target point for the vehicle and connecting the set target point with preceding target points at intervals of the predetermined time or the predetermined distance, and
   when the second drivable zone having a width equal to or less than a predetermined threshold is present in a direction of travel of the vehicle, the trajectory generation unit calculates a distance from the vehicle to the second drivable zone as a movable distance for the vehicle, or
   when the travel trajectory intersects any of the obstacle areas in the direction of travel of the vehicle, the trajectory generation unit calculates a distance from the vehicle to the second drivable zone preceding a point of intersection as the movable distance for the vehicle.

2. The vehicle control device according to claim 1, wherein the trajectory generation unit sets a center point in the width direction of the second drivable zone as the target point.

3. The vehicle control device according to claim 1, further comprising:
   an ideal travel line generation unit for generating an ideal travel line that passes through a center position in a width direction of the first drivable zone based on the road environment recognized by the road environment recognition unit, wherein
   the trajectory generation unit generates the travel trajectory so as to be approximate to the ideal travel line generated by the ideal travel line generation unit.

4. The vehicle control device according to claim 1, wherein
   the road environment recognition unit recognizes, from information on both-side boundaries or road structures on a travel lane for the vehicle contained in the road environment, the travel lane as divided portions which are a basic travel range in a width direction of the travel lane and deviation tolerance ranges outside the basic travel range, and the trajectory generation unit generates the travel trajectory with the basic travel range during a normal time, whereas the trajectory generation unit generates the travel trajectory with the deviation tolerance ranges when the basic travel range is of a certain width or less or when the obstacle areas are present near a center of the basic travel range.

5. The vehicle control device according to claim 1, wherein the obstacle recognition unit identifies one or more objects present in the direction of travel of the vehicle as the obstacles based on the detection result obtained by the outside state detection unit, and generates the obstacle areas of polygon shapes containing the identified obstacles.

6. The vehicle control device according to claim 1, further comprising:

a vehicle control unit for controlling the vehicle based on the travel trajectory generated by the trajectory generation unit.

* * * * *